US008830268B2

(12) United States Patent
Clodfelter et al.

(10) Patent No.: US 8,830,268 B2
(45) Date of Patent: Sep. 9, 2014

(54) NON-LINEAR IMAGE MAPPING USING A PLURALITY OF NON-LINEAR IMAGE MAPPERS OF LESSER RESOLUTION

(75) Inventors: Robert M. Clodfelter, Dayton, OH (US); Jeff Bayer, Union, OH (US); Paul McHale, Dayton, OH (US); Brad Smith, Xenia, OH (US)

(73) Assignee: Barco NV, Kortrijk (BE)

( * ) Notice: Subject to any disclaimer, the term of this patent is extended or adjusted under 35 U.S.C. 154(b) by 1152 days.

(21) Appl. No.: 12/267,209

(22) Filed: Nov. 7, 2008

(65) Prior Publication Data

US 2010/0118050 A1 May 13, 2010

(51) Int. Cl.
*G09G 5/00* (2006.01)
*H04N 9/31* (2006.01)
*G06F 3/14* (2006.01)
G09G 5/393 (2006.01)
G09G 5/397 (2006.01)
G09G 5/395 (2006.01)

(52) U.S. Cl.
CPC .......... *G06F 3/1446* (2013.01); G09G 2320/02 (2013.01); *H04N 9/3185* (2013.01); G09G 5/393 (2013.01); *H04N 9/3147* (2013.01); G09G 2340/0464 (2013.01); *H04N 9/3197* (2013.01); G09G 5/397 (2013.01); G09G 5/395 (2013.01); G09G 2340/0407 (2013.01)
USPC ........... 345/647; 345/620; 345/505; 345/503; 345/502

(58) Field of Classification Search
None
See application file for complete search history.

(56) References Cited

U.S. PATENT DOCUMENTS

| 5,786,934 | A  | * | 7/1998  | Chiu et al. ............... 359/487.04 |
|-----------|----|---|---------|----------------------------------------|
| 6,075,905 | A  |   | 6/2000  | Herman                                 |
| 6,456,339 | B1 |   | 9/2002  | Surati et al.                          |
| 6,525,772 | B2 |   | 2/2003  | Johnson et al.                         |
| 6,574,040 | B1 | * | 6/2003  | Gosling et al. ................ 359/443 |
| 6,693,684 | B2 |   | 2/2004  | Greene et al.                          |
| 6,715,888 | B1 |   | 4/2004  | Raskar et al.                          |
| 6,756,993 | B2 |   | 6/2004  | Popescu                                |
| 6,804,406 | B1 |   | 10/2004 | Chen                                   |
| 7,015,954 | B1 |   | 3/2006  | Foote et al.                           |
| 7,019,713 | B2 |   | 3/2006  | Hereld et al.                          |

(Continued)

FOREIGN PATENT DOCUMENTS

| EP | 1116385 | 9/1999 |
|----|---------|--------|
| EP | 1116386 | 9/1999 |

(Continued)

OTHER PUBLICATIONS

Ramesh Raskar, Jeroen van Baar, Thomas Willwacher, Srinivas Rao, "Quadric Transfer for Immersive Curved Screen Displays", Sep. 2004, The Eurographics Association and Blackwell Publishing, Computer Graphics Forum, vol. 23, Issue 3, pp. 451-460.*

(Continued)

*Primary Examiner* — Ulka Chauhan
*Assistant Examiner* — Robert Bader
(74) *Attorney, Agent, or Firm* — Renner, Otto, Boisselle & Sklar, LLP

(57) ABSTRACT

A display system and method for displaying an image on a non-planar display that allows the images to be mapped by image mappers while encompassing image data of an adjacent sub-image or sub-images. This allows a single unified image to be displayed in real time without any tearing or positional/angular artifacts at the image boundaries.

20 Claims, 4 Drawing Sheets

(56) References Cited

U.S. PATENT DOCUMENTS

| | | |
|---|---|---|
| 7,029,124 B2 | 4/2006 | Dubin et al. |
| 7,097,311 B2 | 8/2006 | Jaynes et al. |
| 7,145,611 B2 | 12/2006 | Dubin et al. |
| 7,269,299 B2 | 9/2007 | Schroeder |
| 7,277,118 B2 | 10/2007 | Foote |
| 2002/0080302 A1 | 6/2002 | Dubin et al. |
| 2004/0085256 A1 | 5/2004 | Hereld et al. |
| 2004/0085519 A1 | 5/2004 | Dubin et al. |
| 2005/0046700 A1 | 3/2005 | Bracke |
| 2007/0097334 A1 | 5/2007 | Damera-Venkata et al. |
| 2007/0132965 A1 | 6/2007 | Damera-Venkata et al. |
| 2007/0133794 A1 | 6/2007 | Cloutier et al. |
| 2007/0291184 A1 | 12/2007 | Harville et al. |
| 2008/0024683 A1 | 1/2008 | Damera-Venkata et al. |
| 2008/0143978 A1 | 6/2008 | Damera-Venkata et al. |
| 2008/0266321 A1 | 10/2008 | Aufranc et al. |

FOREIGN PATENT DOCUMENTS

| | | |
|---|---|---|
| EP | 1876814 | 1/2008 |
| WO | 0007376 | 2/2000 |
| WO | 0018139 | 3/2000 |
| WO | 2006116536 | 11/2006 |
| WO | 2007102902 | 9/2007 |
| WO | 2008005801 | 1/2008 |
| WO | 2008007507 | 1/2008 |

OTHER PUBLICATIONS

Ramesh Raskar, Jeroen van Baar, Paul Beardsley, Thomas Willwacher, Srinivas Rao, Clifton Forlines, "iLamps: Geometrically Aware and Self-Configuring Projectors", Jul. 2003, ACM, ACM Transactions on graphics—Proceedings of ACM SIGGRAPH 2003, vol. 22, Issue 3, pp. 809-818.*

Han Chen, Rahul Sukthankar, Grant Wallace, Kai Li, "Scalable Alignment of Large-Format Multi-Projector Displays Using Camera Homography Trees", 2002, Proceedings of the conference on Visualization '02, pp. 339-346.*

Andrew Raij, Gennette Gill, Aditi Majumder, Herman Towles, Henry Fuchs "PixelFlex2: A Comprehensive, Automatic, Casually-Aligned Multi-Projector Display", 2003, IEEE, Proceedings IEEE International Workshop on Projector-Camera Systems.*

Michael S. Brown, W. Brent Seales, "A Practical and Flexible Tiled Display System", 2002, IEEE, Proceedings of the $10^{th}$ Pacific Conference on Computer Graphics and Applications (PG'02).*

Greg Humphreys, Mike Houston, Ren Ng, Randall Frank, Sean Ahern, Peter D. Kichner, and James T. Klosowski, "Chromium: A Stream-Processing Framework for Interactive Rendering on Clusters", Jul. 2002, ACM, Jounal of ACM Transactions on Graphics—Proceedings of ACM Siggraph 2002, vol. 21, Issue 3, pp. 693-702.*

Ogata, et al., "A Multi-Projector Display System with Virtual Camera Method for Distortion Correction on Quadric Surface Screens", Feb. 1, 2006, IEICE Transactions on Information and Systems, vol. E89-D No. 2, Abstract Only.*

Raskar, et al. "Multi-Projector Displays using Camera-Based Registration", 1999, IEEE, Proceedings of Visualization '99.*

Brown, et al. "Camera-Based Calibration Techniques for Seamless Multiprojector Displays", 2005, IEEE, Transactions on Visualization and Computer Graphics.*

Clodfelter, et al., "Large High Resolution Display Systems via Tiling of Projectors", 2002, Barco, Technical Report.*

Anonymous, "Christie: The Ultimate Tool for Total Image Control", Christie Digital System—Specification Sheet, http://www.christiedigital.com/NR/rdonlyres/15f6a4d0-4081-888d-B6924dd3ac68/0/christieTwist_nov05.pdf, Chistie Twist brochure, Nov. 2005.*

Greg Humphreys, Matthew Eldridge, Ian Buck, Gordon Stoll, Matthew Everett, Pat Hanrahan, "WireGL: A Scalable Graphics System for Clusters", Aug. 17, 2001, ACM, Proceedings of the $28^{th}$ annual conference on Computer Graphics and Interactive Techniques, pp. 129-140.*

Ogata et al. "A Multi-Projector Display System with Virtual Camera Method for Distortion Correction on Quadric Surface Screens"—Abstract only.

Raskar et al. "Multi-Projector Displays Using Camera-Based Registration".

Hereld et al. "Pixel-Aligned Warping for Multiprojector Tiled Displays" Computer Vision and Pattern Recognition, 2005 IEEE Computer Society Conference on vol. 3, Issue , Jun. 20-26, 2005 p. 104.

Brown et al. "Camera-Based Calibration Techniques for Seamless Multi-projector Displays".

Clodfelter et al. "Large High Resolution Display Systems via Tiling of Projectors".

European Search Report for corresponding application No. 08168649 completed Mar. 20, 2009.

Anonymous, "Christie: The Ultimate Tool for Total Image Control", Christie Digital System—Specification Sheet, http://www.christiedigital.com/NR/rdonlyres/15f6a4d0-4081-888d-B6924dd3ac68/0/christieTwist_nov05.pdf , Christie Twist brochure.

* cited by examiner

NON-LINEAR IMAGE MAPPING USING A PLURALITY OF NON-LINEAR IMAGE MAPPERS OF LESSER RESOLUTION

The present invention relates generally to displaying an image, and more particularly to displaying processed images on a non-planar display,

BACKGROUND

Image mapping solutions allow for the transfer of flat high resolution images to non-planar high resolution display devices with minimal loss in image quality. Image mapping solutions are typically used in simulation and visualization markets employing non-planar screens such as spherical, cylindrical or when off axis projection to a planar screen is employed. Typical systems also provide high angular resolution imagery and therefore require high pixel resolution projector technologies. One example of this is where high resolution projectors are used in conjunction with large field of view projection screens employing an array of multiple projectors for flight simulation purposes.

The term non-planar display refers to display systems requiring image mapping (shaping) of a video image to form a correctly appearing image when viewed according to the system design. This includes systems with planar displays or screens, in the case of projection system, then the desired image on the display or screen must be image mapped.

In a typical high resolution image mapping system, a high resolution image feed is processed using an image mapper, which is also known as a warping electronic. The image mapper is designed to process an entire image in real time with minimal processing delay, shaping it correctly so that the image is geometrically correct when viewed. After the image has been processed by the image mapper, it is displayed as a final non-planar image. If multiple images are to be displayed, the display devices must be adjusted to ensure the images align with one another without any disparity in the region of image abutment or overlap.

In another high resolution image mapping system, where the entire image cannot be processed at once, a high resolution image feed is sub-divided and processed using independent image mappers. Each image mapper processes a segment of the image to allow the original image to be displayed as a non-planar image. Once the images have been processed, they are assembled to produce a final non-planar image. The final non-planar image is then displayed on a display device with some defects in the image.

SUMMARY OF THE INVENTION

The present invention provides a method and apparatus for displaying an image on a non-planar display where the image is composed of at least two sub-images corresponding to respective segments having a field of view and a common boundary segment. The field of view of each sub-image is expanded so as to encompass image data of an adjacent sub-image or sub-images to form an expanded field of view sub-image. Each expanded field of view sub-image is individually processed to form a mapped sub-image for proper display on the respective segment of a non-planar display. Because of the expanded field of view of the sub-images, the mapped sub-image can encompass the entire field of view of the respective segment of the non-planar display without voids or other anomalies that can otherwise occur at the common boundary because of the absence of sufficient image data in non-expanded field of view sub-images. After mapping, the mapped sub-images are cropped to exclude image data outside the common boundary with the adjacent sub-image or sub-images. The cropped sub-images are output to the display device. The cropped sub-images are then combined in the display device along the common boundary with the adjacent sub-image or sub-images to form a final assembled image that is displayed on the non-planar display.

Accordingly, the method and apparatus for displaying an image on a non-planar display allows the images to be mapped by image mappers while encompassing image data of an adjacent sub-image or sub-images. This enables a single unified image to be displayed in real time without any tearing or positional/angular artifacts at the image boundaries.

More particularly, the method for displaying an image on a non-planar display comprises expanding the field of view of at least two sub-images so as to encompass image data of the adjacent sub-image or sub-images to form an expanded field of view sub-image. Each expanded field of view sub-image is processed via an image mapper such as a warp engine that maps the expanded field of view sub-image to form a mapped sub-image so as to allow the image to be displayed on a non-planar display without defects. The mapped sub-images are cropped to exclude image data outside the common boundary with the adjacent sub-image or sub-images. The cropped sub-images are output to the display device. The cropped sub-images are then combined in the display device along the common boundary with the adjacent sub-image or sub-images to form a final assembled image.

In a preferred embodiment, a controller is used to adjust the image mappers for coordinating map parameters used by each image mapper to maintain proper co-alignment between the sub-images. This may be accomplished by using a controlling algorithm to coordinate the adjustment parameters to anticipate the expanded fields of view of the sub-images. The adjustment parameters for the controlling algorithm can be based on a global adjustment map.

Moreover, the present invention provides an apparatus for displaying an image composed of at least two sub-images corresponding to respective segments having a field of view and at least one common boundary segment on a non-planar display. The apparatus comprises a processing assembly configured to expand the field of view of at least two sub-images so as to encompass image data of an adjacent sub-image or sub-images to form an expanded field of view sub-image. The processing assembly is further configured to process each expanded field of view sub-image via an image mapper such as a warp engine that maps the expanded field of view sub-image to form a mapped sub-image. The processing assembly is further configured to crop the mapped sub-images to exclude image data outside the common boundary with the adjacent sub-image or sub-images, and output the cropped sub-images to a display device. The cropped sub-images are combined in the display device along the common boundary with the adjacent sub-image or sub-images to form a final assembled image.

The foregoing and other features of the invention are hereinafter described in greater detail with reference to the accompanying drawings.

DETAILED DESCRIPTION

Figure 1:
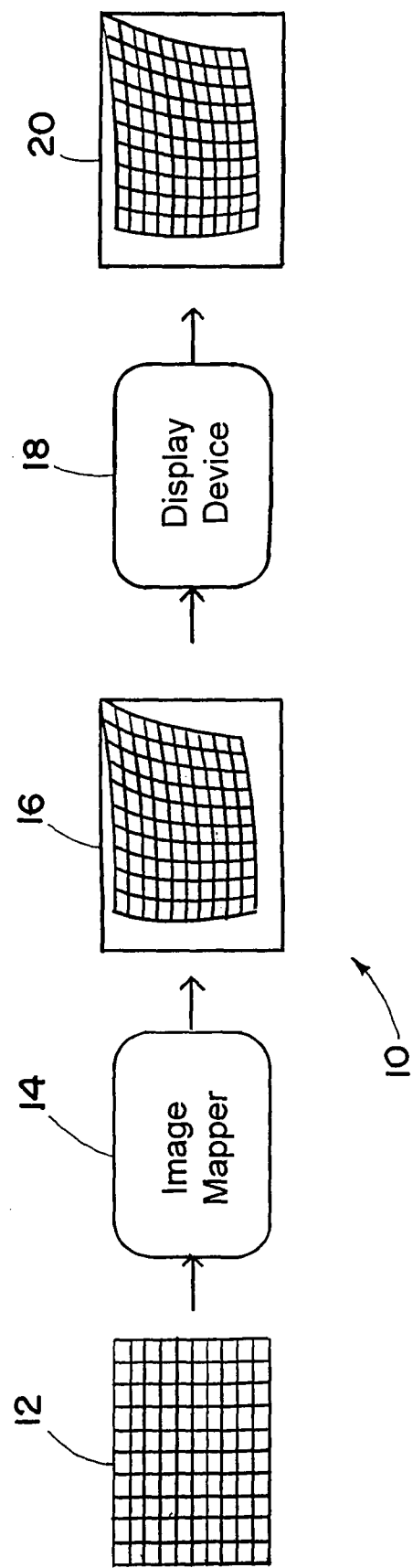
FIG. 1 is a diagrammatic illustration of a conventional image display system.

Referring now in detail to the drawings, a conventional prior art image display system is illustrated in FIG. 1. The prior art image display system, indicated generally at 10, assumes that the image and the processing can be supported singularly by the image display system 10. This system comprises an original video image 12 that is processed by an image mapper 14. The image mapper 14 produces a mapped video image 16. The mapped video image 16 is then sent to the display device 18. The display device 18 then displays the mapped video image 16 as a displayed video image 20. It should be noted that the mapped video image 16 and the displayed video image 20 are the same image. It should further be noted that the displayed video image 20 is not a sub-set of the original video image 12 and therefore the image is being displayed without gaps or anomalies. This conventional architecture presently works up to about a 2048×1536 resolution (QXGA) using top end hardware. For larger images, the mapped video image 16 cannot be streamed in real time due to the image size, amount of needed processing power, and time needed to create the mapped video image 16.

Figure 2:
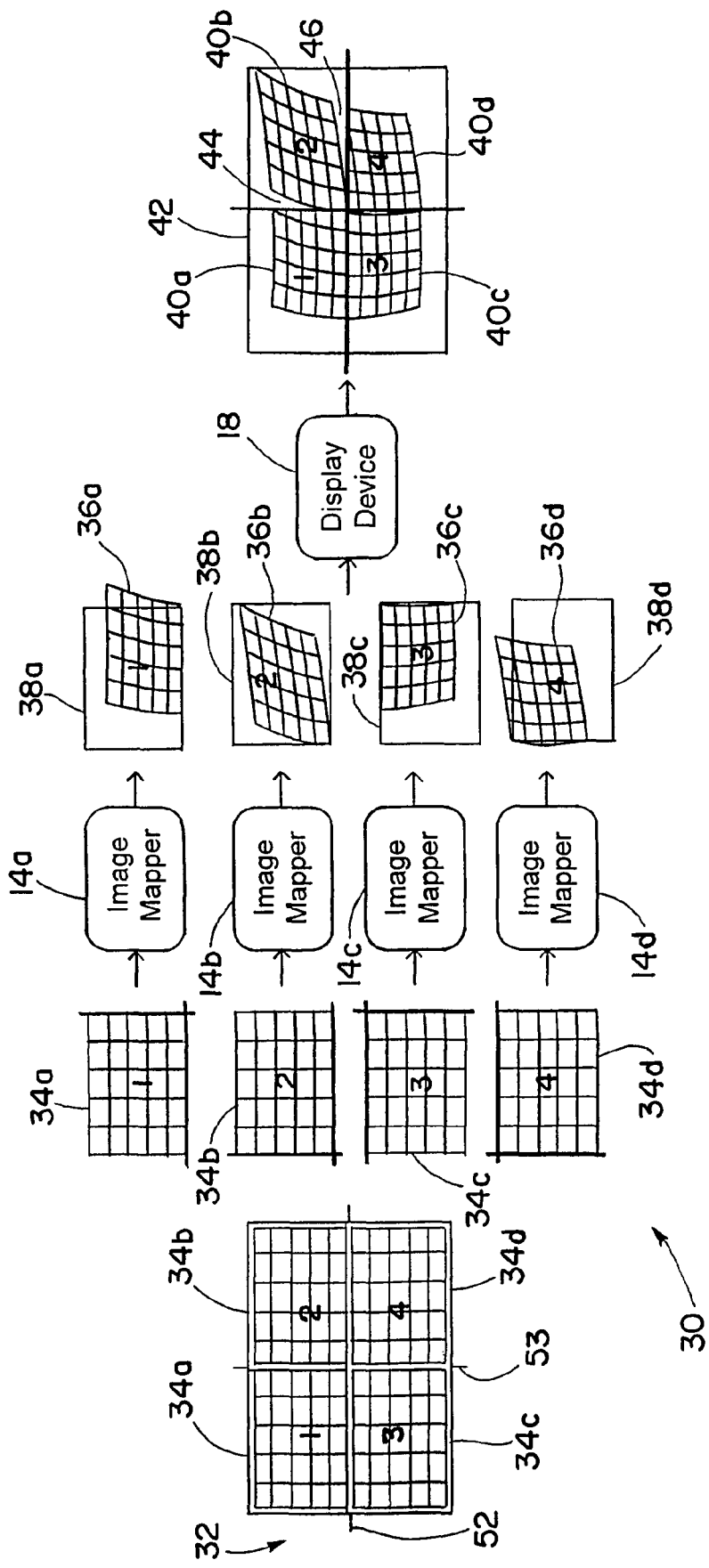
FIG. 2 is a diagrammatic illustration of a second conventional image display system.

In FIG. 2, a second conventional image display system is indicated generally by reference numeral 30. This system processes images with four times the resolution of that of FIG. 1, by paralleling multiple image mappers each with the processing power of that of FIG. 1. The image display system 30 comprises an original image 32 that is divided into four sub-images 34a, 34b, 34c, and 34d. Each sub-image 34a-d has at least one common boundary segment 52/53 with an adjacent sub-image or sub-images. The four sub-images 34a-d are processed independently by four image mappers 14a, 14b, 14c, and 14d, which produce four mapped video images 36a, 36b, 36c, and 36d.

The four mapped video images 36a-d are shown in relation to the original image areas 38a, 38b, 38c, and 38d. The mapped video images 36a-d are cropped to exclude the image data outside the common boundary segment 52/53 with the adjacent sub-image or sub-images, which would be the image data outside the image areas 38a-d. The cropped sub-images 40a, 40b, 40c, and 40d are sent to the display device 18. The cropped sub-images 40a-d are then combined in the display device 18 along the common boundary with the adjacent sub-image or sub-images to form a final assembled image 42. The result of this mapping architecture is that the reconstituted image has missing portions along one or more of the boundaries, these missing portions being depicted at 44 and 46. It is possible in special cases to avoid these missing portions or gaps if the image mapping does not require image correction along the boundary edges. However, this special case is very restrictive and impractical for general systems.

Figure 3:
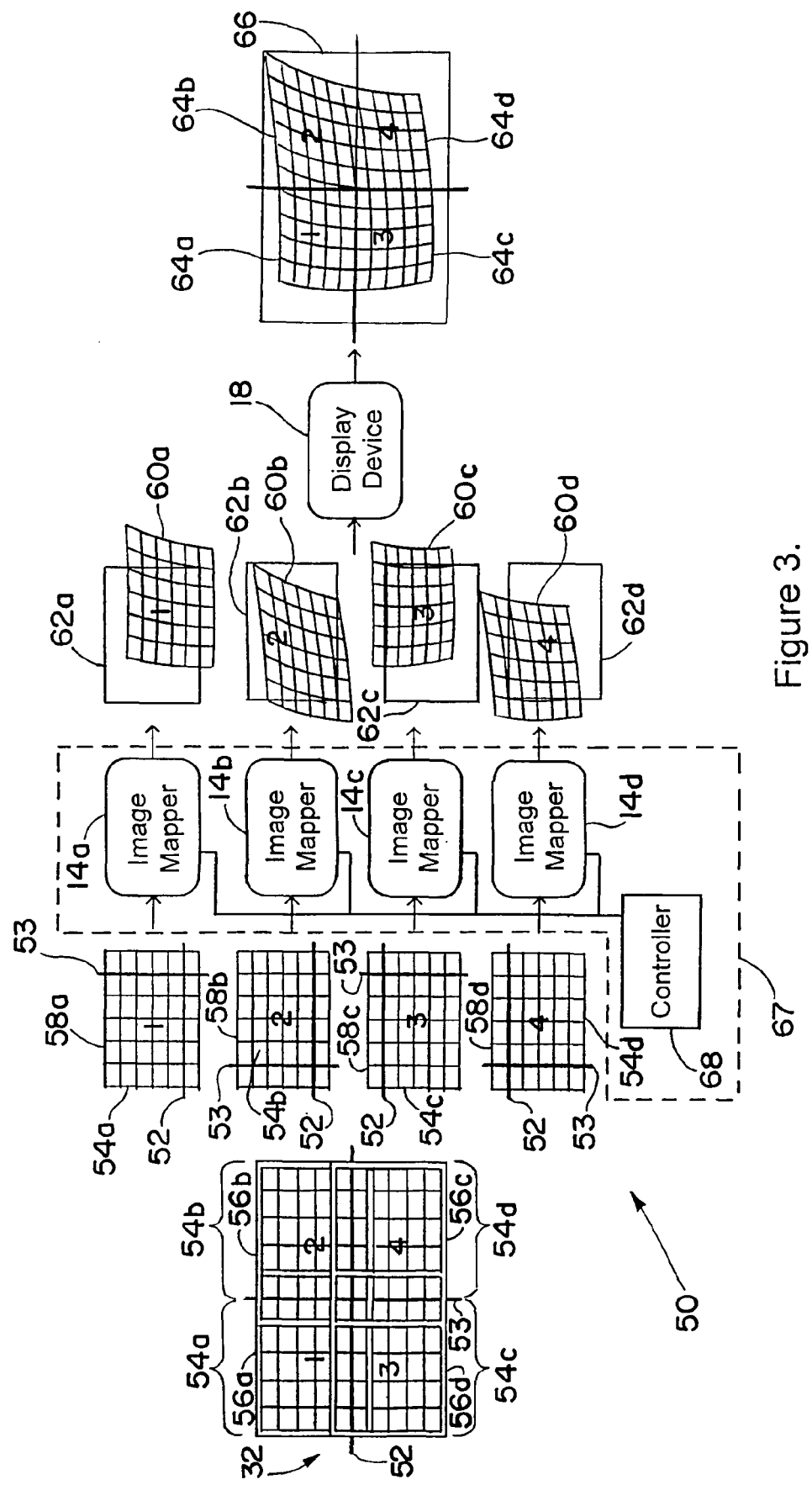
FIG. 3 is a diagrammatic illustration of an exemplary image display system.

In FIG. 3, an exemplary image display system according to the present invention is indicated generally by reference numeral 50. The image display system 50 comprises an original image 32, which can be any type of image including a video image, a high resolution video image, a still image, a computer generated image such as one produced by an image generator, etc. The original image 32 may be a single image that is divided into sub-images to provide for more efficient processing and real time data streaming. The original image 32 may also be composed of multiple images with each image acting as a sub-image and forming a single unified image constrained to a fixed, non-overlapping format. The original image 32 may further be composed of multiple images partitioned in any conceivable way and forming a single unified image constrained to a fixed, non-overlapping format.

The image 32 may be divided into at least two sub-images (four indicated at 54a, 54b, 54c, and 54d by way of example) that correspond to respective segments (four indicated at 56a, 56b, 56c, and 56d) having a field of view and at least one common boundary segment 52/53, where each sub-image 54a-d is individually processed and assembled for display. The segments 56a-d may, but are not required to be of an equal size and shape. FIG. 3 represents an image 32 that is composed of four equal sub-images 54a-d that correspond to four respective segments 56a-d. The common boundary segments 52/53 represent the boundaries between the sub-images 54a-d.

The fields of view of the at least two sub-images 54a-d are expanded so as to encompass image data of an adjacent sub-image or sub-images to form expanded field of view sub-images 58a, 58b, 58c, and 58d. The image data of the adjacent sub-image or sub-images is represented by the data on the opposite side of the common boundary segments 52/53 from the sub-images 54a-d, shown in the expanded field of view sub-images 58a-d. By expanding the fields of view of the sub-images 54a-d, necessary overlapping information is provided to allow each sub-image 54a-d to be independently mapped without the need to share adjacent image data.

The expanded field of view sub-images 58a-d are processed in a processing assembly 67. The processing assembly 67 includes at least two image mappers (four indicated at 14a, 14b, 14c, and 14d by way of example) and a controller 68. Each expanded field of view sub-image 58a-d is individually processed via respective image mappers 14a-d, such as warp engines. The image mappers 14a-d map the expanded field of view sub-images 58a-d to form mapped sub-images 60a, 60b, 60c, and 60d. The image mappers operate at a sub-image resolution instead of a final output image resolution, which allows for faster image processing. Generally, the image 32 will represent a flat image, and the image mappers 14a-d are needed to transform the flat image into one capable of being displayed on a non-planar display. The system dependent image mapping produces an image that can be viewed with correct geometry by an observer, and also combines the images into a common coordinate system. By doing so, the video image 32 can be displayed on a display device 18 without defects.

The mapped sub-images 60a-d are shown in relation to the image areas 62a, 62b, 62c, and 62d. The image areas 62a-d are the same pixel resolution throughout the entire system. Meaning, the pixel sizes of the expanded field of view sub-images 58a-d are the same as the pixel sizes of the image areas 62a-d. This results in the images being displayed by the system 50 being of a slightly lower angular resolution than the images input into the system 50, but the resolution difference is not a significant difference so as to affect the quality of the images. For example, assume a sub-image has a resolution of 2048×1200, and needs 10% of the pixels from an adjacent image, which would be roughly 200 pixels. When the field of view of the sub-image is expanded and the image is received by an image mapper, the sub-image will represent about 1848 pixels and the adjacent images pixels will represent the remaining 200 pixels. After the image is mapped, the image inside the image area will have been expanded to again represent an image with a pixel resolution of 2048. It is not necessary that the pixel resolutions of the input and output images from the image mappers are the same or that all the input or all the output image resolutions are the same. However, this is typically the case.

The mapped sub-images 60a-d are cropped in the processing assembly 67 to exclude image data outside the common boundary with the adjacent sub-image or sub-images. This results in the pixels outside the common boundary segment 52/53 with the adjacent sub-image or sub-images being dropped. Generally, a high definition projector will only accept images with fixed, identical resolutions. A typical 4096×2400 resolution projector accepts four sub-images each with 2048×1200 pixel resolution. The amount of pixels that get cropped from the image can be minimized by an astute designer based on the theoretical shape of the system's required image map or warp. Depending upon how the desired image shape curves in the region of the boundaries, pixels from an adjacent sub-image may or may not be used. If the pixels from the adjacent sub-image are not needed, they are cropped from the image.

After the images are cropped, cropped sub-images 64a, 64b, 64c, and 64d are output to the display device 18, multiple display devices, or alternatively can be output to a storage device (not shown). The cropped sub-images 64a-d are then combined in the display device is along the common boundary segment 52/53 with the adjacent sub-image or sub-images to form a final assembled image 66. The final assembled image 66 can then be displayed on the display device 18. The display device 18 may be in the form of a projector such as a high resolution projector, a monitor, an LCD display, a plasma display, etch, and may include device drivers or video processors to convert output data to display data that is rendered or renderable on the display device 18. It should be noted that the final assembled image 66 is a sub-set of the video image 32 and therefore the image being displayed is capable of taking up the entire area shown by the display device 18

Alternatively, after the images are cropped, cropped sub-images 64a-d are combined in the processing assembly 67 along the common boundary segment 52/53 with the adjacent sub-image or sub-images to form the final assembled image 66. The final assembled image 66 is then output to the display device 18, multiple display devices, or alternatively can be output to a storage device (not shown). The final assembled image 66 can then be displayed on the display device 18.

The image mappers 14a-d in FIG. 3 can be adjusted using the controller 68, which coordinates adjustment parameters used by each image mapper 14a-d to maintain co-alignment between sub-images. A controlling algorithm can be used by the controller 68 to coordinate the adjustment parameters. The adjustment parameters are modified to anticipate additional field of view information that is used to form the expanded field of view sub-images 58a-d. The adjustment parameters used by the controlling algorithm can be based on a global adjustment map. The final assembled image 66 is presented without any tearing or positional/angular artifacts at the image boundaries according to frustum definitions used in the generation of the images. Depending on the image result desired, the fields of view can be expanded to any size, including expanding the field of view so that a straight image can be displayed as a wedge. Even if the images are originally aligned, which is not necessary, the images will be processed as mentioned above so that the additional processing may occur in parallel at high speeds using low cost hardware. This allows for the images to be processed in real time while still reducing the cost of the image display system.

The above mentioned configuration is particularly useful in the simulation and visualization markets where high pixel counts are required, such as with 8 and 10 megapixel projectors, otherwise known as high resolution projectors, like the Barco LX-5 projector that operates at a pixel resolution of 4096×2400. A high resolution projector is able to show more picture details than conventional projectors. The configuration allows for existing lower resolution non-linear image mapping technology to be used, such as a Barco pixel map processor that operates at a resolution of up to 2048×1200, in conjunction with a high megapixel projector.

Figure 4:
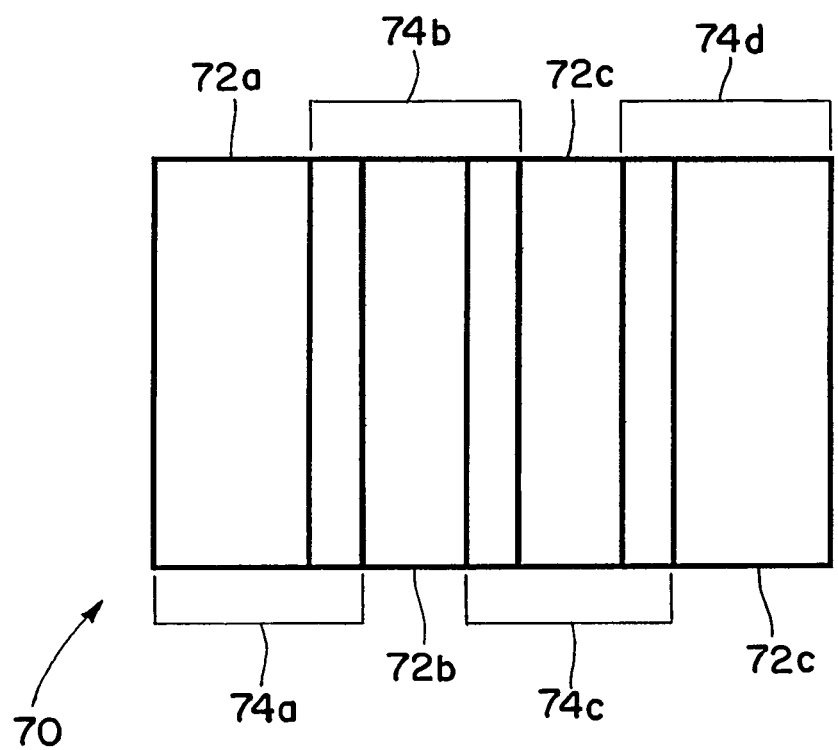
FIG. 4 is an illustration of an image in a 1×4 array with an expanded field of view.

The sub-images 54a-d can be processed by the image display system 50 in a 2×2 array, a 1×4 array, etc. The sub-images 54a-d can be the same size as each other or can be of varying sizes. Further, each sub-image can be expanded a different percentage than the other sub-images. As shown in FIG. 4, an original image 70 may be divided into four sub-images 72a, 72b, 72c, and 72d in a 1×4 array. The field of view of each sub-image is expanded so as to form expanded field of view sub-images 74a, 74b, 74c, and 74d. The expanded field of view sub-images 74a-d can then be processed by respective image mappers, cropped to exclude image data outside the common boundary with the adjacent sub-image or sub-images, output to a display device and combined along the common boundary with the adjacent sub-image or sub-images.

An example may be where the sub-images and the image data from the adjacent sub-image or sub-images may initially represent a resolution of about 1024×2400. They are processed in the respective image mappers, cropped, output and combined as stated above. This results in each sub-image being displayed in a 1×4 array with a resolution of 1024×2400 on a high resolution projector having an output resolution of 4096×2400. Another example may be an image divided into a 2×2 array as shown if FIG. 3, where each sub-image with the image data from the adjacent sub-image or sub-images may initially represent a resolution of about 2048×1200. The images are processed in the respective image mappers, cropped, output and combined as stated above. This results in each sub-image being displayed in a 2×2 array with a resolution of 2048×1200 on a high resolution projector having an output resolution of 4096×2400.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

Aspects of the invention considered to be novel and inventive are once again set out in the following.

Accord to one aspect of the invention, there is provided a method for displaying an image on a non-planar display, the image being composed of at least two sub-images corresponding to respective segments having a field of view and at least one common boundary segment, where each sub-image is individually processed and assembled for display, the method comprising:

expanding the field of view of at least two sub-images so as to encompass image data of an adjacent sub-image or sub-images to form an expanded field of view sub-image;

processing each expanded field of view sub-image via an image mapper such as a warp engine that maps the expanded field of view sub-image to form a mapped sub-image so as to allow the image to be displayed on a non-planar display without defects;

cropping the mapped sub-images to exclude image data outside the common boundary with the adjacent sub-image or sub-images; and outputting the cropped sub-images to a display device.

In one embodiment according to the afore-mentioned method the cropped sub-images are combined in the display device along the common boundary with the adjacent sub-image or sub-images to form a final assembled image.

According to a further embodiment of the afore-mentioned method, the final assembled image is displayed on the display device.

According to a still another embodiment of the afore-mentioned method, the display device is a high resolution projector.

Preferably, the image mappers are adjusted using a controller for coordinating adjustment parameters used by each image mapper to maintain co-alignment between the sub-images.

In the afore-mentioned embodiment, the controller may use a controlling algorithm for coordinating the adjustment parameters.

Preferably, the adjustment parameters from the controlling algorithm are based on a global adjustment map.

In another embodiment of the afore-mentioned method, four sub-images that encompass image data of an adjacent sub-image or sub-images have a resolution of about 2048×1200 from a 2×2 array are processed in the respective image mappers, cropped, and output to the projector as four sub-images in a 2×2 array with each sub-image having a resolution of 2048×1200.

In still a further embodiment of the afore-mentioned method, four sub-images that encompass image data of an adjacent sub-image or sub-images have a resolution of about 1024×2400 from a 1×4 array are processed in the respective image mappers, cropped, and output to the projector as four sub-images in a 1×4 array with each sub-image having a resolution of 1024×2400.

According to another aspect of the invention there is provided an apparatus for displaying an image composed of at least two sub-images corresponding to respective segments having a field of view and at least one common boundary segment on a non-planar display, the apparatus comprising:

a processing assembly configured to:

expand the field of view of at least two sub-images so as to encompass image data of an adjacent sub-image or sub-images to form an expanded field of view sub-image;

process each expanded field of view sub-image via an image mapper such as a warp engine that maps the expanded field of view sub-image to form a mapped sub-image;

crop the mapped sub-images to exclude image data outside the common boundary with the adjacent sub-image or sub-images; and output the cropped sub-images to a display device.

In one embodiment of the afore-mentioned apparatus, the cropped sub-images are combined in the display device along the common boundary with the adjacent sub-image or sub-images to form a final assembled image.

In another embodiment of the afore-mentioned apparatus, the cropped sub-images are combined in the processing assembly along the common boundary with the adjacent sub-image or sub-images to form the final assembled image.

Preferably, the final assembled image is displayed on the display device.

It is advantageous that the display device is a high resolution projector.

More preferably, the high resolution projector operates at a resolution of 4096×2400.

In a further embodiment of the afore-mentioned apparatus, the processing assembly includes the image mappers and a controller.

It is preferred that the image mappers are adjusted using the controller for coordinating adjustment parameters used by each image mapper to maintain co-alignment between the sub-images.

Moreover, the controller may use a controlling algorithm for coordinating the adjustment parameters.

In particular, the adjustment parameters from the controlling algorithm are based on a global adjustment map.

In another embodiment of the afore-mentioned apparatus, the image mappers operate at a sub-image resolution.

What is claimed is:

1. A method for displaying an image on a non-planar display, the image being composed of at least two sub-images corresponding to respective segments having a field of view and at least one common boundary, where each sub-image is individually processed and assembled for display and the at least one common boundary represents the boundary between adjacent sub-images, the method comprising:

expanding the field of view of at least two sub-images so as to encompass image data of an adjacent sub-image or adjacent sub-images to form respective expanded field of view sub-images;

processing each expanded field of view sub-image via a respective image mapper that maps the respective expanded field of view sub-image to form a respective mapped sub-image so as to allow the mapped sub-image to be displayed on a non-planar display without defects;

cropping the mapped sub-images to exclude image data outside the common boundary with the adjacent sub-image or adjacent sub-images;

combining the cropped sub-images into a final assembled image; and outputting the final assembled image from a display device.

2. A method according to claim 1, wherein the cropped sub-images are combined in the display device along the common boundary with the adjacent sub-image or sub-images to form the final assembled image.

3. A method according to claim 1, wherein outputting the final assembled image from the display device includes displaying the final assembled image on the display device.

4. A method according to claim 1, wherein the display device is a single high resolution projector.

5. A method according to claim 1, wherein the image mappers are warp engines that are adjusted using a controller for coordinating adjustment parameters used by each image mapper to maintain co-alignment between the sub-images.

6. A method according to claim 5, wherein the controller uses a controlling algorithm for coordinating the adjustment parameters.

7. A method according to claim 6 wherein the adjustment parameters from the controlling algorithm are based on a global adjustment map.

8. A method according to claim 1, wherein:

four sub-images that encompass image data of an adjacent sub-image or sub-images have a resolution of about 2048×1200 from a 2×2 array are processed in the respective image mappers, cropped, and output to the display device as four sub-images in a 2×2 array with each sub-image having a resolution of 2048×1200; and the four sub-images are combined by the display device into the final assembled image prior to the final assembled image being output from the display device.

9. A method according to claim 1, wherein:

four sub-images that encompass image data of an adjacent sub-image or sub-images have a resolution of about 1024×2400 from a 1×4 array are processed in the respective image mappers, cropped, and output to the display device as four sub-images in a 1×4 array with each sub-image having a resolution of 1024×2400; and the four sub-images are combined by the display device into the final assembled image prior to the final assembled image being output from the display device.

10. An apparatus for displaying an image composed of at least two sub-images corresponding to respective segments having a field of view and at least one common boundary segment on a non-planar display, wherein the at least one common boundary represents the boundary between adjacent sub-images, the apparatus comprising:

a processing assembly configured to:

expand the field of view of at least two sub-images so as to encompass image data of an adjacent sub-image or adjacent sub-images to form respective expanded field of view sub-images;

process each expanded field of view sub-image via a respective image mapper that maps the respective expanded field of view sub-image to form a respective mapped sub-image;

crop the mapped sub-images to exclude image data outside the common boundary with the adjacent sub-image or adjacent sub-images;

combine the cropped sub-images into a final assembled image; and output the final assembled image from a display device.

11. An apparatus according to claim 10, wherein the cropped sub-images are combined in the display device along the common boundary with the adjacent sub-image or sub-images to form the final assembled image.

12. An apparatus according to claim 10, wherein the cropped sub-images are combined in the processing assembly along the common boundary with the adjacent sub-image or sub-images to form the final assembled image.

13. An apparatus according to claim 10, wherein outputting the final assembled image from the display device includes displaying the final assembled image on the display device.

14. An apparatus according to claim 13, wherein the display device is a single high resolution projector.

15. An apparatus according to claim 14, wherein the high resolution projector operates at a resolution of 4096×2400.

16. An apparatus according to claim 10, wherein the processing assembly includes the image mappers and a controller.

17. An apparatus according to claim 16, wherein the image mappers are warp engines that are adjusted using the controller for coordinating adjustment parameters used by each image mapper to maintain co-alignment between the sub-images.

18. An apparatus according to claim 17, wherein the controller uses a controlling algorithm for coordinating the adjustment parameters.

19. An apparatus according to claim 18, wherein the adjustment parameters from the controlling algorithm are based on a global adjustment map.

20. An apparatus according to claim 10, wherein the image mappers operate at a sub-image resolution.

* * * * *